United States Patent
Drengstig et al.

(10) Patent No.: US 7,357,097 B2
(45) Date of Patent: Apr. 15, 2008

(54) DEVICE FOR SHELLFISH FARMING

(76) Inventors: Tormod Drengstig, Hunsteintunet 24, N-4085, Hundvag (NO); Asbjorn Drengstig, Sundelin 18, N-4048, Hafrsfjord (NO); Ivar Kollsgard, Vigdelveien 63, N-4053, Raege (NO)

( * ) Notice: Subject to any disclaimer, the term of this patent is extended or adjusted under 35 U.S.C. 154(b) by 207 days.

(21) Appl. No.: 10/531,671

(22) PCT Filed: Oct. 17, 2003

(86) PCT No.: PCT/NO03/00344

§ 371 (c)(1),
(2), (4) Date: Apr. 15, 2005

(87) PCT Pub. No.: WO2004/036987

PCT Pub. Date: May 6, 2004

(65) Prior Publication Data

US 2005/0284395 A1 Dec. 29, 2005

(30) Foreign Application Priority Data

Oct. 25, 2002 (NO) .................................. 20025122

(51) Int. Cl.
*A01K 61/00* (2006.01)
(52) U.S. Cl. ...................................... 119/207; 119/225
(58) Field of Classification Search ........ 119/208–210, 119/212–214, 224, 225, 207, 438, 453, 843, 119/844
See application file for complete search history.

(56) References Cited

U.S. PATENT DOCUMENTS

| | | | | |
|---|---|---|---|---|
| 428,983 A | * | 5/1890 | Weston ........................ 119/214 |
| 796,579 A | * | 8/1905 | Jessop ......................... 312/125 |
| 1,658,515 A | * | 2/1928 | Caton .......................... 119/443 |
| 1,785,954 A | * | 12/1930 | Hayes .......................... 312/36 |
| 3,124,101 A | * | 3/1964 | Wierenga, Sr. ............. 119/458 |
| 3,302,615 A | * | 2/1967 | Tietje ......................... 119/419 |
| 3,470,852 A | * | 10/1969 | Bright ......................... 119/843 |
| 3,499,421 A | * | 3/1970 | MacDonald et al. ........ 119/208 |
| 3,691,994 A | * | 9/1972 | McPherson .................. 119/223 |
| 3,738,317 A | | 6/1973 | Reynolds ....................... 119/3 |
| 3,841,266 A | * | 10/1974 | Hoshino ..................... 119/208 |
| 3,877,420 A | * | 4/1975 | Eagleson, Jr. .............. 119/419 |
| 3,902,458 A | * | 9/1975 | Schuck et al. .............. 422/301 |
| 3,916,833 A | | 11/1975 | Serfling ......................... 119/2 |
| 4,003,338 A | * | 1/1977 | Neff et al. ................... 119/223 |
| 4,007,709 A | | 2/1977 | Wishner ......................... 119/2 |
| 4,019,459 A | * | 4/1977 | Neff ............................ 119/223 |
| 4,079,698 A | * | 3/1978 | Neff et al. ................... 119/223 |
| 4,198,924 A | | 4/1980 | Chapman ........................ 119/2 |

(Continued)

FOREIGN PATENT DOCUMENTS

EP   0 681 783 A1   4/1995

(Continued)

*Primary Examiner*—Yvonne R. Abbott
(74) *Attorney, Agent, or Firm*—Mathews, Shepherd, McKay & Bruneau, P.A.

(57) ABSTRACT

Device for cage (1) for shellfish farming, where the cage is placed in the sea or in a tank with water and where the cage's one side (11) is provided with openings, for instance a grid (13) and where the cage's other sides (3, 5, 7, 9) preferably are closed and where the cage (1) is arranged so it can be turned so that the one side provided with openings (11) faces upwards in a vertical feeding position, or faces sideways in a horizontal eating and resting position, or faces downwards in a vertical emptying position, as these positions are achieved by means of the fish farming cage (1) being placed on or by a transporter (25, 55).

9 Claims, 7 Drawing Sheets

U.S. PATENT DOCUMENTS

| | | | |
|---|---|---|---|
| 4,201,154 A * | 5/1980 | Gowrie | 119/420 |
| 4,212,268 A | 7/1980 | Chapman | 119/2 |
| 4,252,081 A * | 2/1981 | Smith | 119/223 |
| 4,266,509 A * | 5/1981 | Gollott et al. | 119/208 |
| 4,292,928 A * | 10/1981 | Kopylov et al. | 119/453 |
| 4,300,477 A | 11/1981 | Chapman | 119/2 |
| 4,337,727 A | 7/1982 | Mickelsen et al. | 119/2 |
| 4,357,902 A * | 11/1982 | Sheldon et al. | 119/202 |
| 4,467,744 A | 8/1984 | Handrus | 119/2 |
| 4,559,902 A | 12/1985 | Mason et al. | 119/2 |
| 5,062,389 A * | 11/1991 | Krehl | 119/57.6 |
| 5,076,210 A * | 12/1991 | Horn | 119/203 |
| 5,172,649 A * | 12/1992 | Bourgeois | 119/223 |
| 5,438,958 A * | 8/1995 | Ericsson et al. | 119/223 |
| 5,628,280 A * | 5/1997 | Ericsson | 119/239 |
| 5,738,225 A * | 4/1998 | Kim | 211/1.57 |
| 5,771,840 A * | 6/1998 | Pelletier | 119/452 |
| 6,041,931 A * | 3/2000 | Jacques | 206/505 |
| 7,222,585 B2 * | 5/2007 | Jablonsky | 119/211 |
| 2003/0084856 A1* | 5/2003 | Hazenbroek et al. | 119/453 |
| 2007/0079765 A1* | 4/2007 | Carter et al. | 119/456 |

FOREIGN PATENT DOCUMENTS

| | | |
|---|---|---|
| FR | 2 719 446 A1 | 5/1994 |
| NO | 168681 | 12/1989 |
| SE | 440 607 | 11/1983 |
| SE | 453 711 | 3/1985 |

* cited by examiner

Snitt 7-7

DEVICE FOR SHELLFISH FARMING

This invention concerns a device for shellfish farming, more specifically as a device for grouping and cyclical transfer of fish farming cages from one feeding position via a feeding sector to a cleansing sector and a resting sector back to the feeding position. The device may be fitted in a ground-based tank or in the sea or in water.

Shellfish such as lobster, crab and crayfish are cannibals by nature. To run a fish farm financial responsibly, the population has necessarily to be dense. The lack of natural hiding places will cause high mortality rates in a fish farm with no possibility for keeping the individuals separated. Shellfish farming must therefore be undertaken with the animals placed in individual storage compartments.

In order to maintain a high level of hygiene in a fish farming facility, it is necessary to remove waste which is formed by excrements, leftover feed and remnants of shell after ecdysis.

Shellfish farming is for the abovementioned reasons labour intensive and costly. When for instance lobsters have an optimum growth at a water temperature of 20° C., the production is very demanding of resources.

There are several known techniques for farming shellfish.

Green Solutions Aquatic Systems Ltd, Kfar Hess 40692 Israel produces circular units. Such installations consist of fish farming cages placed along the circumference of a horizontal drum. A full rotational cycle brings each cage from an upper position near the surface to an opposite position by the drum's lower edge and then back up as the cage follows a circular path. This solution requires a lot of space and work when removing the waste. The solution also has a limited opportunity for scaling up with a view to maximising the use of the area.

The object of this invention is to remedy the disadvantages of the prior art.

The object is achieved according to the invention by means of the features disclosed in the description below and in the following patent claims.

Each shellfish is placed in a fish farming cage, with a size of for instance (length×width×height) 30×20×10 cm, where the largest, opposite surfaces form a bottom plate and a top plate. Four of the outside surfaces are closed. A front wall is formed by a plate provided with openings, and the plate may advantageously be formed as a grid of bars or a wire mesh wall. The openings in the front wall are large enough for feed to be inserted and waste to fall out of the cage when it is being turned. At least one of the lateral surfaces, preferably the bottom or top plate or the front wall, may be releasable. Each cage may advantageously be divided into several sections which can be used for smaller individuals. Such a division may be made by means of partition walls which are pushed into slots or other fixing devices.

The lateral surface which is opposite the front wall forms a back wall. This comprises rapid coupling fastening devices which enable the cage to be fastened to a transporter.

The back wall advantageously comprises one or more apertures to ensure optimum flow-through of clean water.

All the openings of the cage are so small that small shellfish cannot pass through the openings.

Functionally speaking, the fish farming cage has 3 main positions:
 a) The front wall turned upwards, for feeding and eating
 b) The front wall turned sideways, for eating and resting
 c) The front wall turned downwards, for waste removal and resting For the period in which the cage is emptied for waste (position c) and until new feed is supplied, the shellfish has no access to food.

The transporter has an upper drive shaft with a drive gear and a control unit. In the lower end the transporter has turning wheels. The transporter may advantageously comprise several sets of turning wheels and support rollers placed between the drive shaft and the lower end of the transporter. Two or more chains, tooth belts, link chains or other suitable means of transmission are led in a suitable path over the drive shaft, support rollers and turning wheels. Between the means of transmission there are fitted several cross connections provided with fixing devices which correspond to the fastening devices on the back wall of the cage. The transporter is arranged so that several cages can be places side by side and in storeys, so that the entire width and length of the transporter are filled with cages. The distance between the cages is limited to what is necessary in order to grasp the cage when attaching and disengage it from the transporter.

Alternatively, the transporter can be provided with tooth belts which also have teeth on the outside of the belts. A channel is arranged on the outside of the transporter and around the entire circumference of the transporter. The channel is adjusted to the bottom surface of the cage. The back wall of the cage comprises one or two toothed sections which correspond with the external teeth of the tooth belts. Detached cages are led towards the transporter and grasped by the tooth belts, led into the channel and brought downwards along the transporter. The transporter's turning wheels and drive shaft advantageously comprise flexible grasping and control discs which press towards the ends of the cage in order to make it easier to move the cage through the bends of the channel.

When the cage has reached the lowest point of the transporter in the alternative embodiment, it is rapidly brought back to the water surface by means of buoyancy or by means of another transporter which moves the cage upwards at a greater speed. The object of this embodiment is to reduce the period in which the animal is without feed.

Detached floating cages are taken out and put into the transporter in a buffer zone. This is also used for inspection of the individuals.

A detached cage is made floatable by means of one or more integrated buoyancy elements or by the wall materials being of such a nature that they provide sufficient buoyancy.

The path of the transporter is arranged so that it in one or more positions brings the cage up towards the water surface so that the front wall of the cage is turned upwards. The path is also arranged so that the cage in at least one position is turned so that the cage has its front wall directed downwards in a detached manner.

The transporter with the cages is placed directly in sea/water or in a fish farming tank. The height of the transporter is adapted to the water depth in question or to the period the shellfish can be without access to feed. The transporter's width may vary within quite liberal boundaries, but when placed in a tank the width will advantageously be adjusted to the dimensions of the tank, so that the volume of the tank can be utilised to the maximum.

When the transporter is set in motion, a cage is brought to the water surface by the transporter leading the attached cage up to the water surface, or alternatively the detached cage is freed from the transporter's lowest point and floats to the water surface by means of the cage's buoyancy. At the water surface, the cage is positioned with the front wall facing upwards by means of the transporter's rotating movement. While the cage is in this position, feed is supplied from a suitable feeding installation known as per se. The animal's eating period starts and continues until the feed is consumed or until the cage reaches a position on the transporter where the cage is turned with the perforated front wall facing downwards, so that the cage is emptied of waste and remaining feed.

The transporter moves continuously or gradually. Any intervals of standstill are used for feeding the shellfish in the cages that are positioned with the grid opening facing upwards on top of the transporter. A feeding installation placed over the upper end of the transporter releases portions of feed to the entire or parts of the row of cages. The feeding can advantageously be done individually, for instance controlled by a computer, based on registered growth of the individual in each cage.

When a row of cages is in feeding position, inspection and other necessary tending are undertaken, for instance removal of dead individuals.

A complete tank will advantageously comprise a mechanical scraping plant and/or sludge sucking plant known as per se for collection of waste from the bottom of the tank.

In the following, a non-limited example of a preferred embodiment is described and illustrated in the accompanying drawings, in which.

Figure 1:
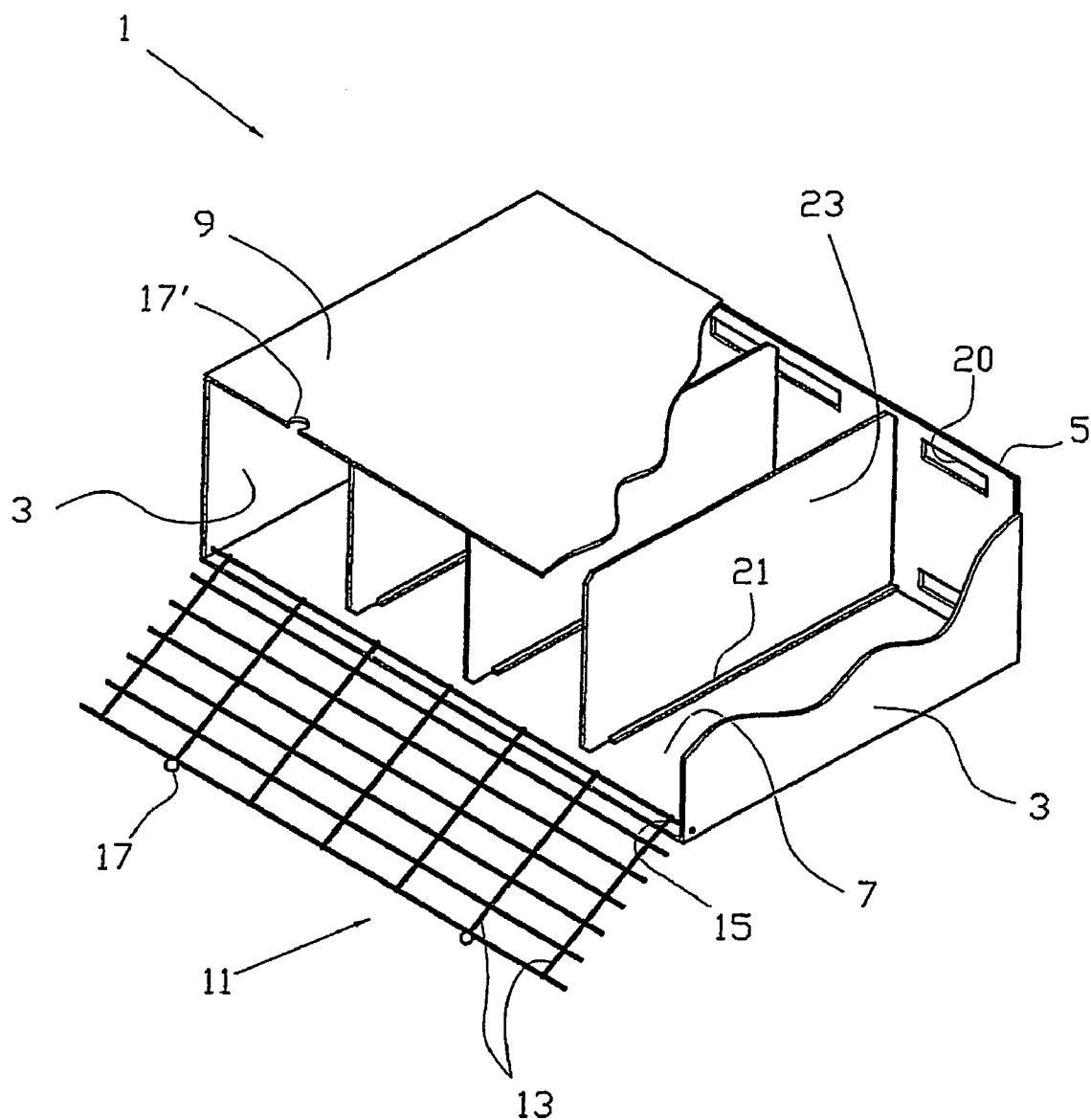
FIG. 1 shows a cage with an open front wall and partition walls inserted.
Figure 2:
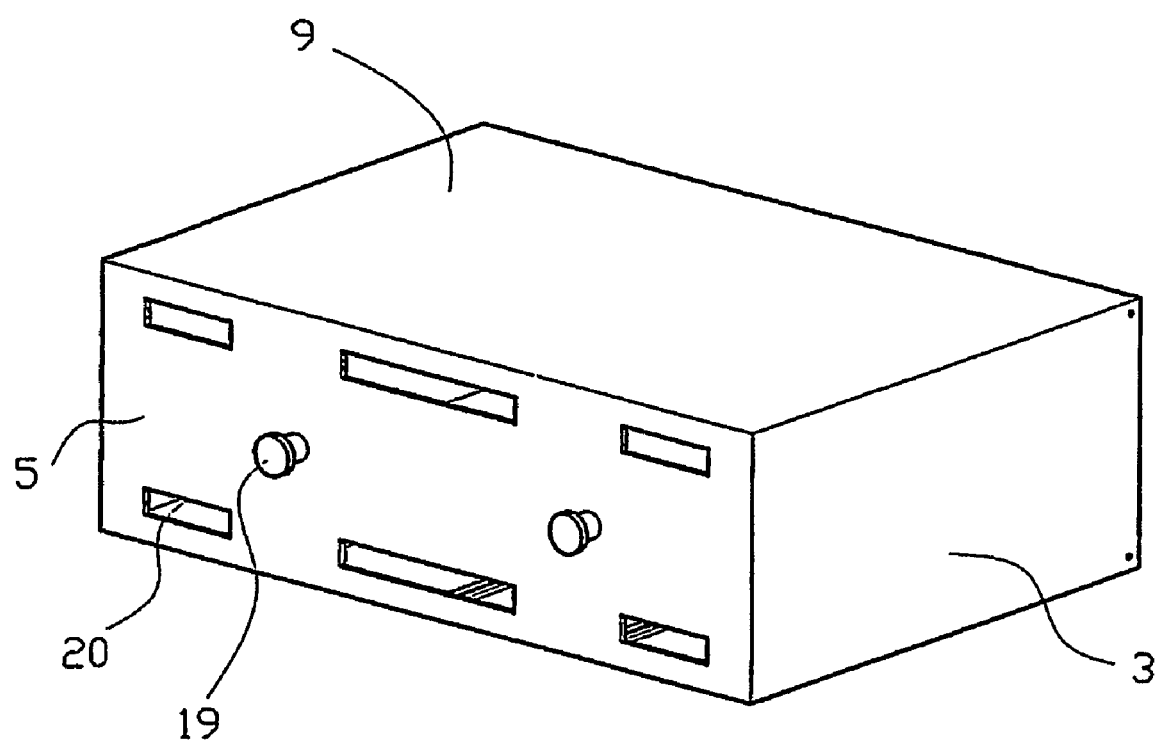
FIG. 2 shows the back wall of a cage.
Figure 3:
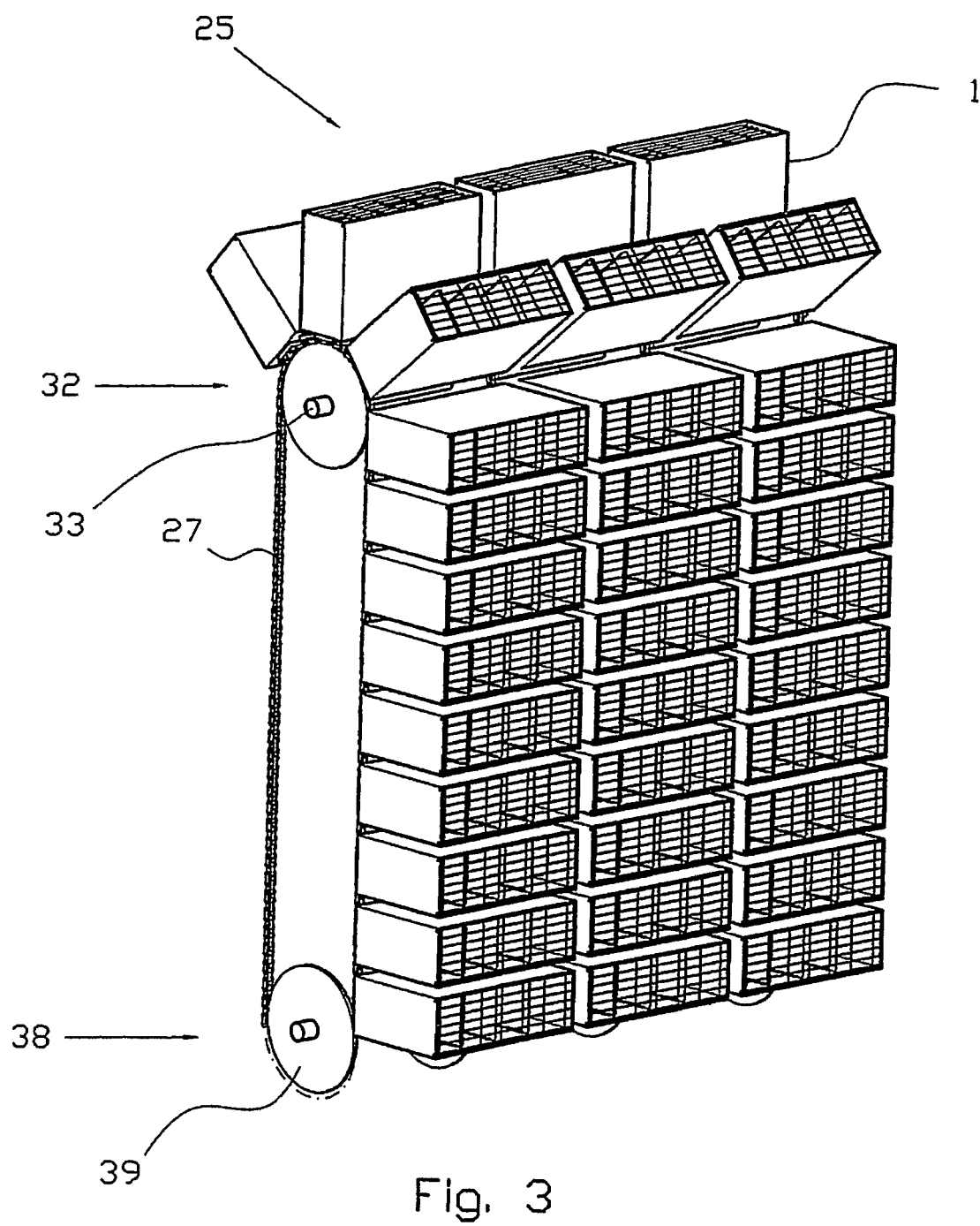
FIG. 3 shows a principle drawing of a transporter, here shown with a width of three cages.
Figure 4:
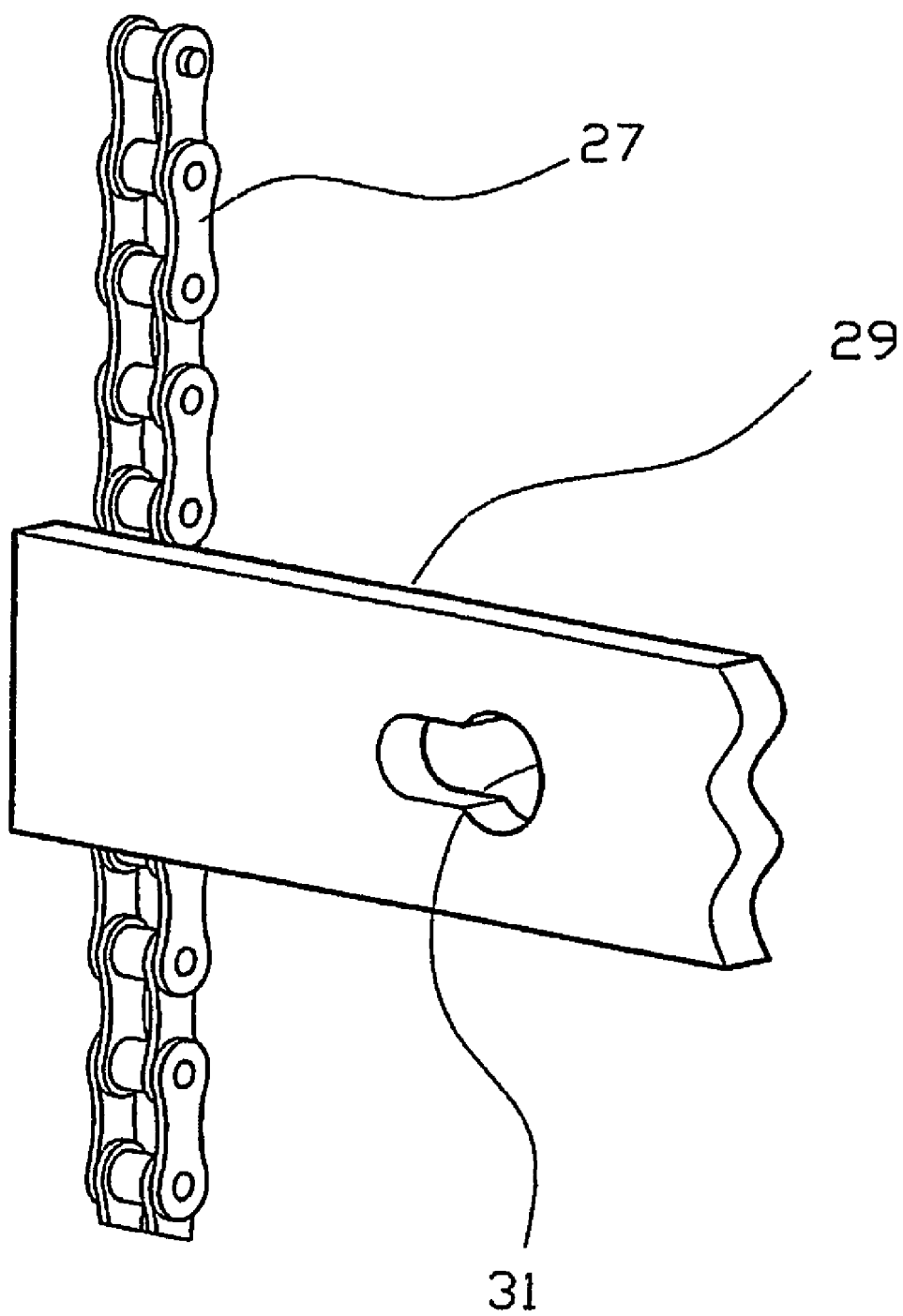
FIG. 4 shows the transporter's carrying plate in detail.
Figure 5:
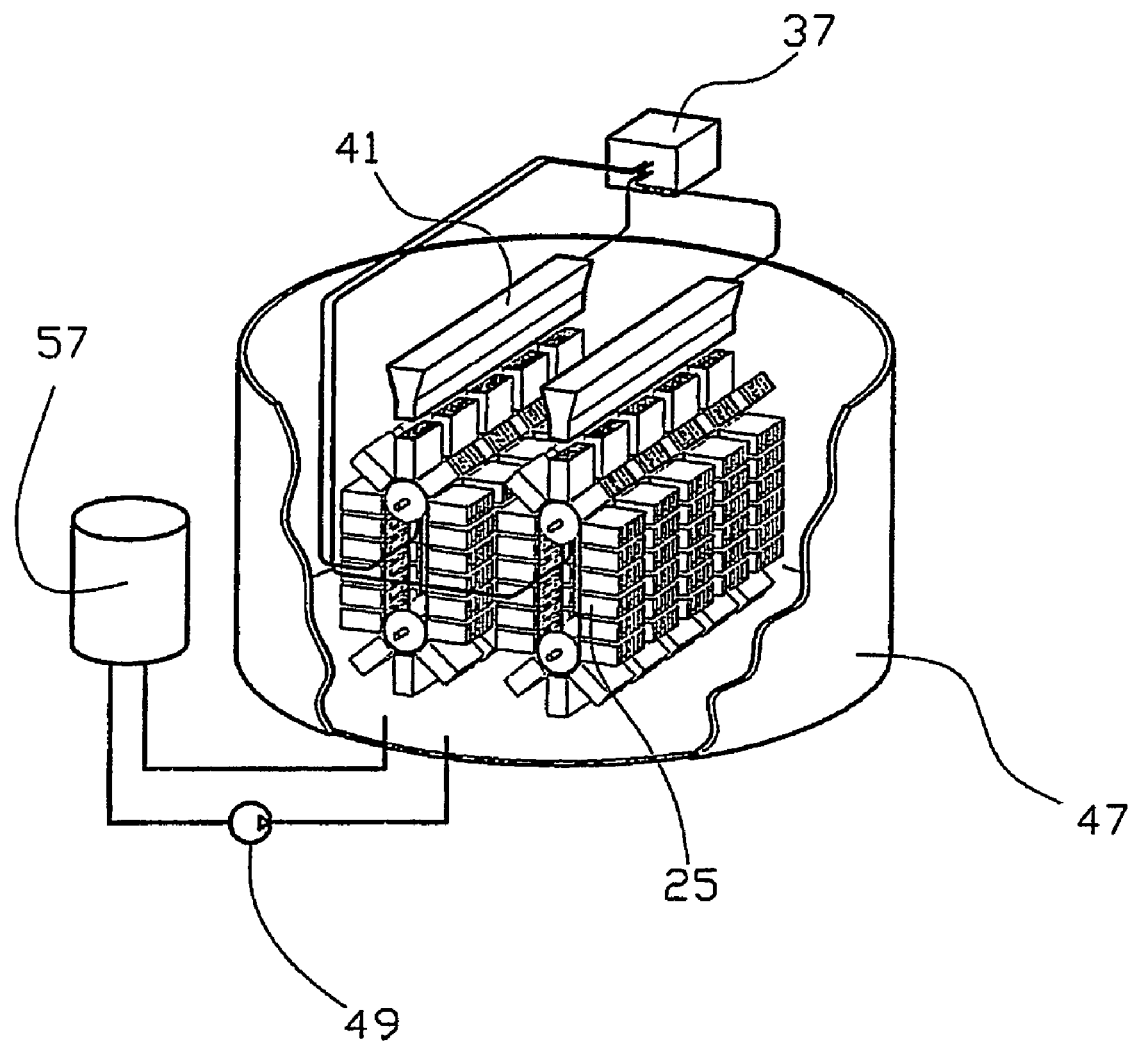
FIG. 5 shows an overview of a fish farming tank provided with two transporters.
Figure 6:
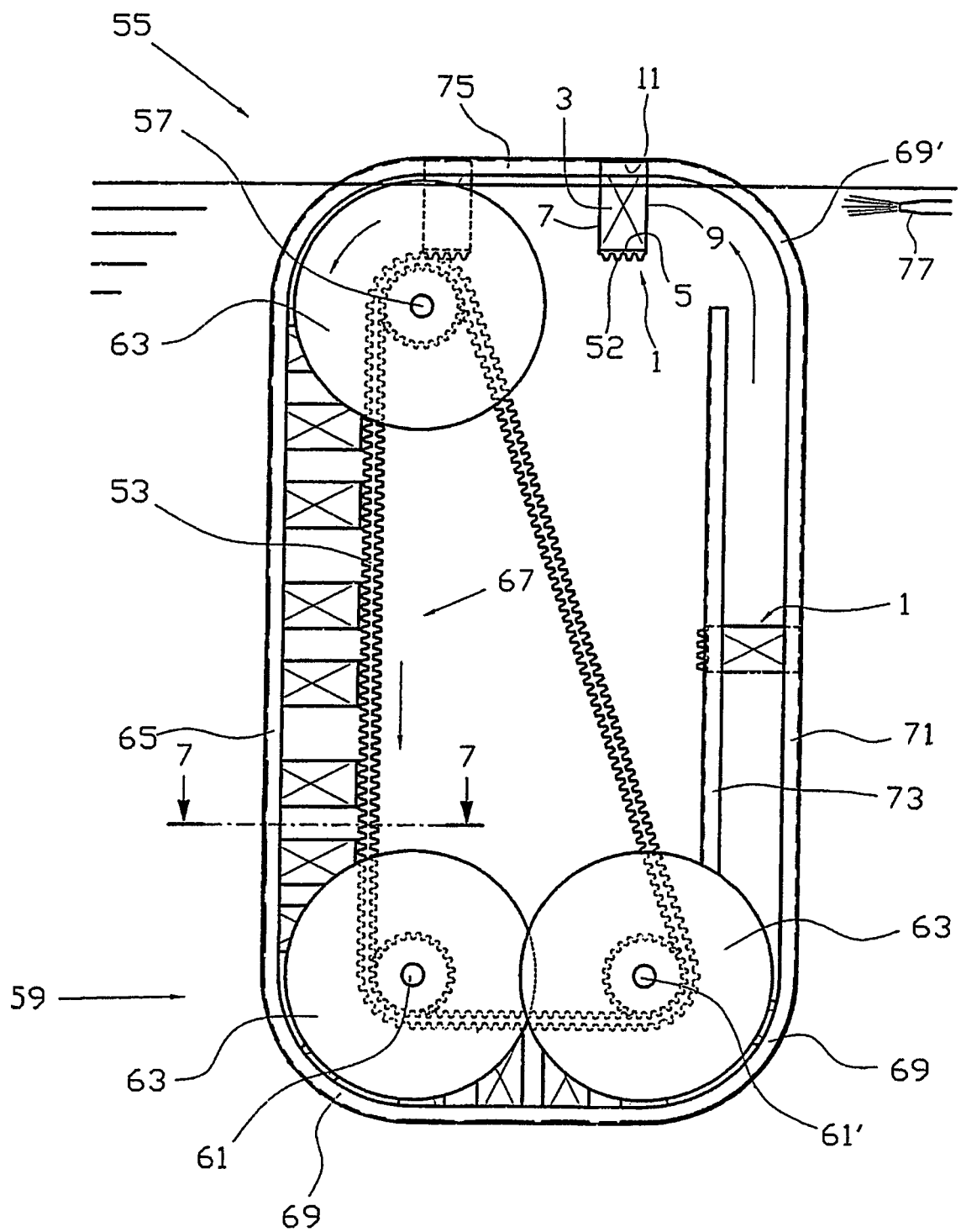
FIG. 6 shows an alternative embodiment of a transporter, where detached cages are led forward by means of a tooth belt.
Figure 7:
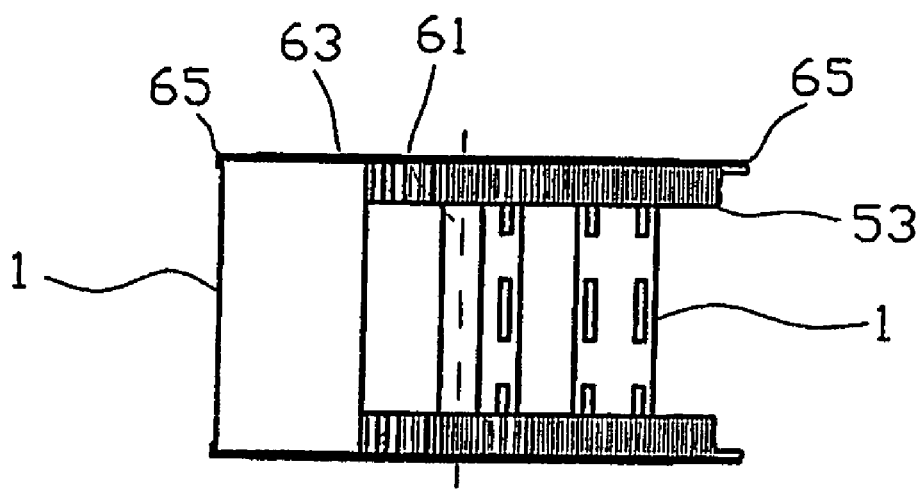
FIG. 7 shows a horizontal section 7-7 as indicated in FIG. 6.

On the drawings, the reference number 1 denotes a cage with sidewalls 3, back wall 5, bottom plate 7 and top plate 9. The front wall 11 is provided with a number of openings 13, hinges 15 and locks 17, 17'. The back wall 5 is provided with locking bolts 19 and several apertures 20. The bottom plate 7 and top plate 9 are provided with slots 21 fitted on the inside for fastening up to three partition walls 23.

A transporter 25 is provided with several drive chains 27. To the chains 27 are fastened several carrying plates 29 with locking slots 31 which correspond complementary with the cage's 1 locking bolt 19. In the transporter's upper end 32 a drive shaft 33 with appurtenant driving motor (not shown) is placed, attached to a programmable control unit 37. In the transporter's lower end 38, turning wheels 39 are placed.

Above the transporter's upper end 32 it is placed a feeding installation 41 which is connected to the programmable control unit 37.

Two transporters 25 are placed in a fish farming tank 47. The tank 47 is connected to a circulation pump 49 and a biofilter 57.

Shellfish are placed in the cage 1. Up to four small animals can share a cage 1 when one or more partition walls 23 are inserted into the slots 21. The front wall 11 is closed and the cage 1 is, by means of the locking bolts 19, attached to the locking grooves 31 (so-called spanner slots) on a carrying plate 29.

When the size of the animal so suggests, the animals are dispersed in more cages with bigger room, by removing the partition walls 23. The individual shellfish spends the last part of its life cycle alone in a fish farming cage 1.

When the cage is placed on the transporter, the driving motor (not shown) and the control unit 37 make the cages move. As a row of cages reaches the transporter's upper end 32 and is standing on edge with the front walls 11 facing upwards, the transporter's movement will stop or retard, and feeding is initiated by means of the feeding installation 41.

The period in which the cage 1 is moving from the transporter's 25 upper end 32 towards its lower end 38 is employed by the shellfish for feeding.

As the cage 1 reaches the lower end 38, it is once more turned on edge, this time with the front wall 11 facing downwards. Leftover feed, excrements and remnants from ecdysis fall through the front wall's 11 openings 13 and out of the cage 1. After a while, the waste will sediment on the bottom of the tank 48.

The cage 1 moves from the lower end 38 into a horizontal resting position and stays in this position until it has been lifted to the upper end 32 where a new cycle is initiated when feed is supplied.

Waste sediment on the bottom of the tank 48 is collected by means of suitable sludge scrapers known as per se, and sludge suckers (not shown) are set into motion and silty water is sucked out by means of a sludge pump (not shown) known as per se.

In fish farms with little or no access to heated water (waste heat), the circulation pump 49 will pump water through a bio filter 57 where ammonia and ammonium are converted to nitrate and nitrite.

Several transporters 25 and feeding installations 41 may be placed in a tank 47.

Several tanks 47 may be connected to the same control unit 37.

In an alternative embodiment, the fish farming cage 1 is, according to previous description, provided with a toothed section 52 on the back wall 5. By means of buoyancy elements (not shown), for instance integrated in the walls, the cage 1 is suitable for floating in water with the front wall 11 facing upwards. The toothed section 52 corresponds complementary with an externally toothed tooth belt 53 on a transporter 55.

The transporter 55 is provided with an upper drive shaft 57 with a drive gear (not shown) known as per se. A lower part 59 of the transporter 55 comprises two pairs of turning wheels 61, 61'. The upper drive shaft 57 and the two pairs of turning wheels 61, 61' are each provided with two flexible discs 63 which are suitable for pushing against the end walls 3 when the cage 1 is led in between the discs 63.

Two guidance rails 65 with L-shaped cross-sections are placed in a distance from a descending middle part 67 of the transporter 55 and the horizontal lower part 59 of the transporter 55. Around the drive shaft 57 and the turning wheels 61, 61', the guidance rails 65 have a sector shape 69 with L-shaped cross-sections which mainly have their centre in the drive shaft 57, the centre of the turning wheels 61, 61' respectively. The guidance rails 65 are extended in a vertical section 71 from the second pair of turning wheels 61' and are led along substantially the entire vertical extension of the transporter 55. In parallel with the vertical guidance rail section 71, a pair of support rails 73 are placed. The rails 65, 73 have a reciprocal distance which provides room for the fish farming cage 1 by buoyancy to be led through the passageway which is formed between the rails 65, 73 with its bottom plate 7 or top plate 9 facing the direction of travel. The rails 65 have a reciprocal distance and a distance to the tooth belt 53 which is suitable for the cage 1 by meshing between the toothed part 52 and the tooth belt 53 with its bottom plate 7 or the top plate 9 facing the direction of travel to be led forwards by means of the movement of the transporter 55.

The vertical section of the guidance rails 65 goes via a sector 69' over in a horizontal rail section 75 which is connected to the starting point of the rails by the drive shaft 57, so that the guidance rails 65, 69, 71, 69' form two closed circles.

A pump (not shown) with appurtenant pipe (not shown) and nozzle 77 is suitable for setting the water in the fish farming tank 47 in a flowing motion in a direction along the rail section 75 towards the drive shaft 57.

A cage 1 floating in an upright position by the transporter 55 is, by means of said flowing motion in the water, brought towards the drive shaft 57. The end surfaces 3 of the cage 1 come into contact with the flexible discs 63. The discs lead the cage's 1 toothed part to mesh with the tooth belt 53, which then leads the cage downwards in the tank 47. The cage 1 is controlled by the guidance rails 65. As the cage 1 is released from the flexible discs 63 of the second pair of turning wheels 61', it rises quickly by means of its own buoyancy to the tank's 47 surface, controlled by the guidance rails 65, 73. Floating with the perforated front wall 11 facing upwards, it is then led by the flowing motion in the water in towards the drive shaft 57, where it again is grasped by the transporter 55 and led into a new cycle.

Feeding of shellfish placed in the cage 1 in its second embodiment as well as removing waste from the cage 1 is carried out in the same way as described for the first embodiment. The most important change in the fish farming cycle is that with the second embodiment, the periods in which an animal is without access to feed are shorter.

The invention claimed is:

1. Device for shellfish farming, comprising a transporter and a cage, wherein said cage has a plurality of sides, a first side of said cage having openings, a second side of said cage having couplings for engaging said cage onto said transporter, wherein said second side is located opposite said first side, wherein engagement of said cage onto said transporter provides for mechanical repositioning of said cage by said transporter to achieve a plurality of positions, wherein said first side faces upwards to accommodate the administration of food in a first position, faces sideways to accommodate shellfish eating and resting in a second position, and faces downwards to accommodate emptying in a third position.

2. The device according to claim 1, wherein said cage is provided with buoyancy elements large enough for a detached cage to float in water.

3. The device according to claim 1, wherein said transporter is provided with a toothbelt and said cage couplings are toothed sections which render the cage suitable for being grasped and led forward by the transporter in motion.

4. The device according to claim 3, wherein said transporter is provided with guidance rails for guiding the movement of said cage wherein said cage is moved between said toothbelt and said guidance rails, and wherein said first side of said cage faces upwards when the cage is at the upper part of said transporter.

5. The device according to claim 1, wherein said cage is provided with slots for fastening partition walls.

6. The device according to claim 1, wherein said cage is placed on or by said transporter so that an upper end of said transporter has a vertical position with said first side of said cage facing upwards and a lower end of said transporter has a vertical position with said first side of said cage detached and facing downwards.

7. The device according to claim 6, also comprising sections between said upper end and said lower end, said sections being in a horizontal position.

8. The device according to claim 6, also comprising sections between said upper end and said lower end, said sections being in a vertical position when said first side of said cage faces upwards.

9. The device according to claim 6, also comprising sections between said upper end and said lower end, said sections being in a vertical position when said first side of said cage faces downwards and is covered.

* * * * *